UNITED STATES PATENT OFFICE 2,476,341

RUBBERLIKE COPOLYMERS OF ALLYL ESTERS

Karl H. Weber, Lancaster, Pa., assignor to Armstrong Cork Company, Lancaster, Pa., a corporation of Pennsylvania No Drawing. Application December 31, 1943, Serial No. 516,567

9 Claims. (Cl. 260—84.5)

This invention relates to synthetic rubber-like materials and is primarily concerned with the formation of such materials from allyl esters of aliphatic acids containing 12 to 18 carbon atoms copolymerized with either an open chain, conjugated, aliphatic diene containing 4 to 6 carbon atoms or a mixture of such a diene and one or more copolymerizable compounds.

It is well-known that an open chain, conjugated, aliphatic diene, such as butadiene-1.3, can be copolymerized with a compound, such as styrene, in an aqueous emulsion to produce a rubber-like material somewhat similar to natural rubber. One of the most widely used synthetic rubbers is a butadiene-styrene copolymer commonly referred to as "Buna S." This synthetic rubber-like material is comparatively dry and crumbly and, in general, is relatively difficult to mill.

It is an object of this invention to provide new synthetic rubber-like materials and to provide a synthetic rubber-like material which is somewhat plastic and which can be readily milled on the usual rubber mill rolls. These and other objects will become more apparent from the following description and claims.

I have discovered that one or more open chain, conjugated, aliphatic dienes containing 4 to 6 carbon atoms or a mixture of such a diene and a compound copolymerizable therewith in an aqueous emulsion, such as styrene, substituted styrenes, for example methyl styrene, alpha-methyl-para-methyl-styrene, and the like, and acrylonitrile, may be copolymerized with an allyl ester of an aliphatic acid containing 12 to 18 carbon atoms to produce rubber-like materials which may be vulcanized and which may be used to replace, at least to a certain extent, natural rubber. It is surprising to find that the allyl esters can be copolymerized to produce rubber-like materials comparable to natural rubber because heretofore, the esters which have been copolymerized with one or more such dienes to produce materials resembling natural rubber have been esters of vinyl alcohol. While the allyl esters do contain a C=C linkage, the allyl group in polymerization reactions is less active than the vinyl group. Further, while it has been known that the allyl esters could be polymerized, polymerized diallyl phthalate resins, for example, are hard and glass-like and in no way resemble rubber.

The conjugated aliphatic diene may be any aliphatic conjugated diene containing 4 to 6 carbon atoms, for example, butadiene-1.3, 2.3-dimethyl butadiene, isoprene, chloroprene, bromoprene, iodoprene, or the like, or mixtures thereof may be used.

In the copending U. S. Patent application Serial No. 461,783, now abandoned, filed October 12, 1943, by myself and Paul O. Powers, there is disclosed the copolymerization of such a diene with one or more vinyl esters of the higher fatty acids. Such vinyl esters are also within the scope of the present invention.

The allyl esters are the esters of allyl alcohol and an aliphatic monocarboxylic acid containing 12 to 18 carbon atoms such as lauric acid, myristic acid, palmitic acid, stearic acid, oleic acid, linoleic acid, linolenic acid, and the like or mixtures thereof and especially those monocarboxylic acids derived from the naturally occurring glycerides such as linseed oil, soya bean oil, cottonseed oil, rapeseed oil, castor oil, fish oils, mixtures thereof and the like. These allyl esters may be prepared in any suitable manner or may be prepared as described in the U. S. Patent No. 2,249,768.

In general, I prefer to effect the polymerization of the polymerizable monomeric ingredients in an aqueous emulsion. Such emulsions may be prepared in the usual manner with the aid of an emulsifying agent. It is desirable but not essential that a polymerization catalyst be employed. It is also desirable to incorporate in the emulsion a polymerization regulator, though I have obtained satisfactory results without such a regulator.

I prefer to prepare my new rubber-like copolymers from three monomeric components for I have found that better rubber-like materials more nearly resembling natural rubber are produced when the polymerization emulsion includes such a conjugated diene, an allyl ester, and a copolymerizable compound than when the copolymerizable compound is omitted. Further, I prefer to employ the allyl esters in amounts not greater than about 20% based on the total weight of the polymerizable monomeric ingredients and I especially prefer to employ the allyl ester in an amount of from about 5% to 15%. If a larger amount of an allyl ester is used, the allyl ester tends to produce a rubber-like material which is too soft and plastic for most purposes and also unduly retards the polymerization reaction thereof. For the preparation of relatively soft tacky rubber-like materials which are suitable for rubber adhesives and similar purposes, it may be desirable to employ the allyl esters in amounts greater than 20%. If less than 5% of allyl ester is used, the ester has no noticeable effect, though satisfactory rubber-like products can be obtained with less than 5% of ester.

The following examples, in which all parts are by weight unless otherwise set forth, serve to illustrate my invention, but not to limit it to the exact proportions except as defined in the appended claims.

Example 1

A rubber-like copolymer of an allyl ester was prepared as follows:

| | Parts |
|---|---|
| Butadiene-1.3 | 212.5 |
| Allyl esters of linseed oil acids | 37.5 |
| Water | 300 |
| 2-amino-2-methyl-1-propanol oleate | 10 |
| 2-amino-1-propanol | 1.5 |
| Potassium persulfate | 5 |

This emulsion was agitated for a period of about 13 days at a temperature of about 25–35° C. to produce a rubber-like latex. The latex was coagulated with acetic acid and the polymeric product was a plastic, rubber-like material characterized by excellent cohesion.

The vulcanized product similar to vulcanized natural rubber was prepared as follows:

| | Parts |
|---|---|
| The above synthetic polymer | 100 |
| Carbon black | 50 |
| Zinc oxide | 5 |
| Sulphur | 2 |
| N-cyclohexylbenzthiazylsulphenamide | 1.2 |
| Pine tar | 5 |

These ingredients were readily mixed on the usual rubber mill and then cured for 90 minutes at 280° F. The vulcanized product had a tensile strength of 1860 pounds per square inch, an elongation of 320% and a Shore hardness of 64.

Example 2

| | Parts |
|---|---|
| Isoprene | 212.5 |
| Allyl esters of linseed oil acids | 37.5 |
| Water | 300 |
| 2-amino-2-methyl-1-propanol oleate | 10 |
| 2-amino-2-methyl-1-propanol | 1.5 |
| Potassium persulfate | 0.5 |

This emulsion was agitated for 13 days at 25–35° C. and the resultant latex coagulated with acetic acid. The rubber-like copolymer was characterized by good plasticity and when cured and vulcanized as described in Example 1, the vulcanized product has a tensile strength of 1550 pounds per square inch, an elongation of 800% and a Shore hardness of 45.

Example 3

A rubber-like allyl ester copolymer was prepared as follows:

| | Parts |
|---|---|
| Butadiene-1.3 | 162.5 |
| Styrene | 62.5 |
| Allyl esters of linseed oil acids | 12.5 |
| Vinyl esters of linseed oil acids | 12.5 |
| Water | 300 |
| 2-amino-2-methyl-1-propanol oleate | 10 |
| 2-amino-2-methyl-2-propanol | 1.5 |
| Potassium persulfate | .5 |

This emulsion was agitated 12 days at a temperature of 25–35° C. and the resultant rubber-like material was much more plastic than the usual butadiene-1.3-styrene copolymer. This material was readily compounded and vulcanized as set forth under Example 1. The vulcanized product had a tensile strength of 3580 pounds per square inch, an elongation of 550% and a Shore hardness of 64. It compared quite favorably with a vulcanized natural rubber.

Example 4

A rubber-like allyl ester copolymer was prepared as follows:

| | Parts |
|---|---|
| Butadiene-1.3 | 825 |
| Styrene | 325 |
| Allyl esters of linseed oil acids | 125 |
| Water | 2225 |
| Sodium stearate | 60 |
| 2-amino-2-methyl-1-propanol | 20 |
| Sodium persulfate (polymerization catalyst) | 3.9 |
| Dodecyl mercaptan (polymerization regulator) | 6 |
| Glue (emulsion stabilizer) | 25 |

This emulsion was agitated for 13 days at 50° C. and the latex coagulated with acetic acid. A yield of about 1200 parts of a rubber-like copolymer was obtained. This material was compounded and vulcanized as set forth under Example 1. The vulcanized product has a tensile strength of 2230 pounds per square inch, an elongation of 580% and a Shore hardness of 60.

All of the unvulcanized rubber-like materials of the above examples were relatively plastic and cohesive and were not dry and crumbly. This is especially noticeable when attempting to compound the rubber-like materials with other ingredients as my products are cohesive on the rubber mill and more readily mix with the other ingredients.

In general, the rubber-like materials of this invention may be used to replace natural rubber and may be compounded or modified in the manner usual when compounding or modifying natural rubber or may be blended with natural rubber.

Having described my invention in detail, it is obvious that modifications may be made therein and that some features may be used without others, all without departing from the spirit or scope of my invention which is defined in the appended claims.

I claim:

1. A rubber-like material comprising the polymerization product of about 162.5 parts by weight of butadiene-1.3, 62.5 parts by weight of styrene, 12.5 parts by weight of the vinyl esters of linseed oil acids, and about 12.5 parts by weight of the allyl esters of linseed oil acids.

2. A rubber-like material comprising the polymerization product of about 825 parts by weight of butadiene-1.3, about 325 parts by weight of styrene, and about 125 parts by weight of the allyl esters of linseed oil acids.

3. A rubber-like material comprising the polymerization product of butadiene-1.3, and an allyl ester of an aliphatic monocarboxylic acid containing from 12 to 18 carbon atoms, said allyl ester being present in an amount from about 5% to about 20% by weight of the total weight of the polymerizable monomeric ingredients.

4. A rubber-like material comprising the polymerization product of isoprene and an allyl ester of an aliphatic monocarboxylic acid containing from 12 to 18 carbon atoms, said allyl ester being present in an amount from about 5% to about 20% by weight of the total weight of the polymerizable monomeric ingredients.

5. A rubber-like composition of matter comprising the copolymer formed by an allyl ester of an aliphatic, monocarboxylic acid containing from 12 to 18 carbon atoms, with a compound selected from the group consisting of open chain, conjugated, aliphatic diene hydrocarbons containing from 4 to 6 carbon atoms, open chain, conjugated, aliphatic diene monohalogenated hydrocarbons containing from 4 to 6 carbon atoms, and a mixture containing a major portion by weight of such a diene and a minor portion by weight of a copolymerizable compound capable of copolymerizing in aqueous emulsion with said diene and selected from the group consisting of styrene, methyl - styrene, alpha-methyl-paramethyl-styrene and acrylonitrile; said allyl ester being present in an amount from about 5% to about 20% by weight of the total weight of polymerizable monomeric ingredients.

6. A composition of matter comprising the copolymer formed by an allyl ester of an aliphatic, monocarboxylic acid containing from 12 to 18 carbon atoms, with a compound selected from the group consisting of open chain, conjugated, aliphatic diene hydrocarbons containing from 4 to 6 carbon atoms, open chain, conjugated, aliphatic diene monohalogenated hydrocarbons containing from 4 to 6 carbon atoms, and a mixture containing a major portion by weight of such a diene and a minor portion by weight of a copolymerizable compound capable of copolymerizing in aqueous emulsion with said diene and selected from the group consisting of styrene, methyl-styrene, alpha-methyl-para-methyl-styrene and acrylonitrile; said allyl ester being present in an amount from about 5% to about 15% by weight of the total weight of polymerizable monomeric ingredients.

7. A rubber-like composition of matter comprising the copolymer formed by reacting allyl esters of linseed oil acids, with a compound selected from the group consisting of open chain, conjugated, aliphatic diene hydrocarbons containing from 4 to 6 atoms, open chain, conjugated, aliphatic diene monohalogenated hydrocarbons containing from 4 to 6 carbon atoms, and a mixture consisting a major portion by weight of such a diene and a minor portion by weight of a copolymerizable compound capable of copolymerizing in aqueous emulsion with said diene and selected from the group consisting of styrene, methyl - styrene, alpha-methyl-paramethyl-styrene and acrylonitrile; with said allyl ester being present in an amount from about 5% to about 20% by weight of the total weight of polymerizable monomeric ingredients.

8. A rubber-like composition of matter comprising the copolymer formed by reacting allyl esters of linseed oil acids with a compound selected from the group consisting of open chain, conjugated, aliphatic diene hydrocarbons containing from 4 to 6 carbon atoms, open chain, conjugated, aliphatic diene monohalogenated hydrocarbons containing from 4 to 6 carbon atoms, and a mixture containing a major portion by weight of such a diene and a minor portion by weight of a copolymerizable compound capable of a copolymerizing in aqueous emulsion with said diene and selected from the group consisting of styrene, methyl-styrene, alpha-methyl-paramethyl-styrene and acrylonitrile; with said allyl ester being present in an amout from about 5% to about 15% by weight of the total weight of polymerizable monomeric ingredients.

9. A composition of matter comprising the copolymer formed by polymerizing a mixture containing a major portion by weight of butadiene-1.3, and a minor portion by weight of styrene, with the allyl esters of linseed oil acids, said esters being present in an amount from about 5% to about 20% by weight of the total weight of the polymerizable monomeric ingredients.

KARL H. WEBER.

REFERENCES CITED

The following references are of record in the file of this patent:

UNITED STATES PATENTS

| Number | Name | Date |
|---|---|---|
| 2,066,330 | Carothers | Jan. 5, 1937 |
| 2,109,943 | Graves | Mar. 1, 1938 |
| 2,249,768 | Kropa | July 22, 1941 |
| 2,273,891 | Pollack | Feb. 24, 1942 |
| 2,313,233 | Fryling | Mar. 9, 1943 |
| 2,390,164 | Moffett | Dec. 4, 1945 |

Certificate of Correction

Patent No. 2,476,341. July 19, 1949.

KARL H. WEBER

It is hereby certified that errors appear in the printed specification of the above numbered patent requiring correction as follows:

Column 3, line 55, Example 2, for the word "has" read *had*; column 4, line 21, Example 4, after the word "stabilizer" insert a closing parenthesis; line 28, for "has" read *had*; column 5, line 46, claim 7, for "6 atoms" read *6 carbon atoms*; line 49, same claim, for "consisting" read *containing*; column 6, line 21, claim 8, for "of a copolymerizing" read *of copolymerizing*;

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*